JOHN McMANUS, OF PITTSBURG, PENNSYLVANIA.

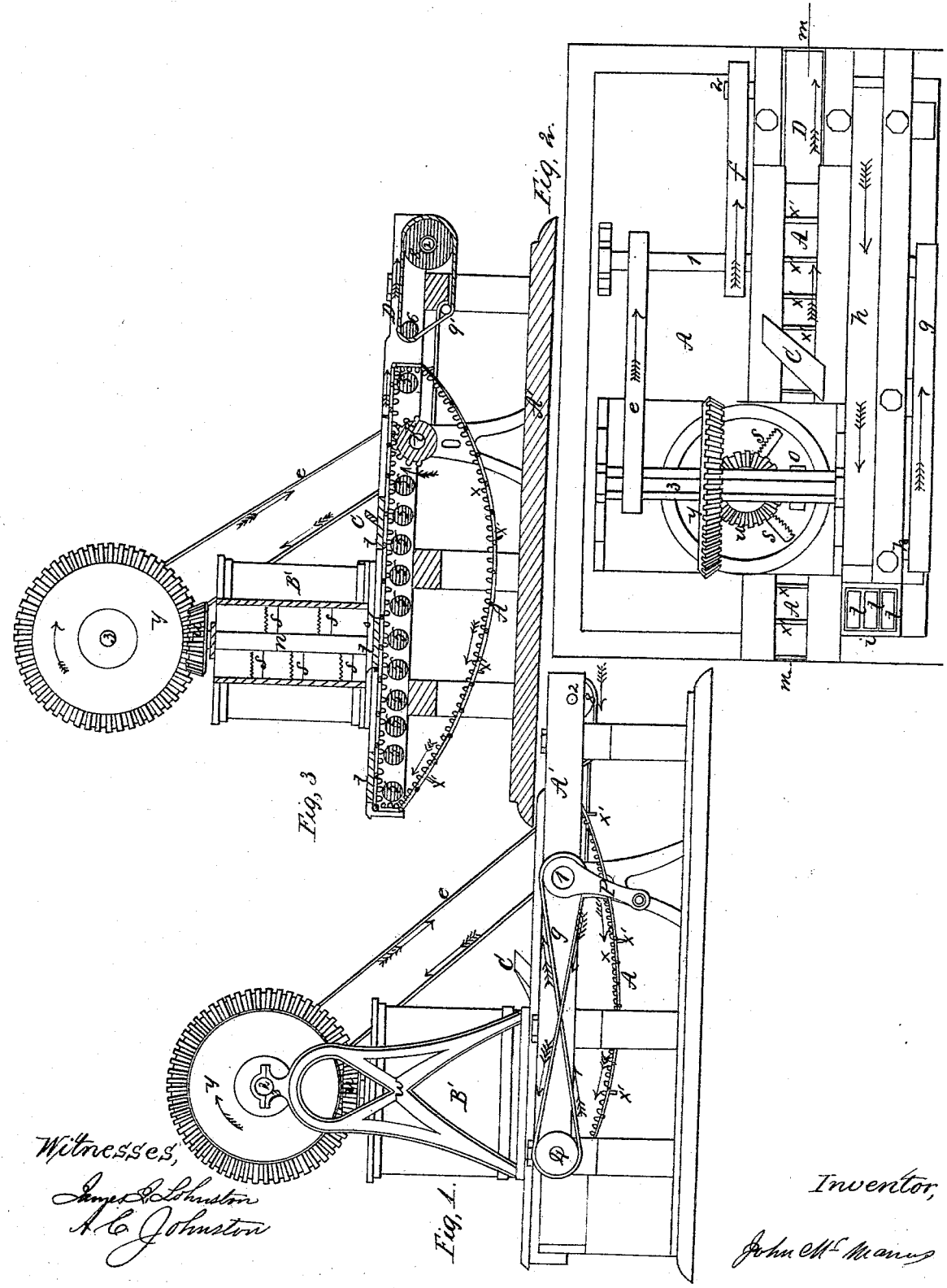

Letters Patent No. 86,853, dated February 9, 1869.

IMPROVED BRICK-MACHINE.

The Schedule referred to in these Letters Patent and making part of the same.

*To all whom it may concern:*

Be it known that I, JOHN MCMANUS, of Pittsburg, in the county of Allegheny, and State of Pennsylvania, have invented a new and useful Improvement in Brick-Machines; and I do hereby declare that the following is a full, clear, and exact description thereof, reference being had to the accompanying drawings, and to the letters and figures of reference marked thereon.

The nature of my invention consists in the arrangement of a mixing-hopper; a jointed, endless apron, for carrying the moulds under the hopper to be filled, and from under it, to be borne off for delivering the brick from the moulds; and an endless belt for carrying back the empty moulds, to be again placed on the jointed and endless apron, to be again carried under the hopper, for the purpose of being filled.

To enable others skilled in the art to make and use my invention, I will proceed to describe its construction and operation.

In the accompanying drawings, which form part of my specification—

Figure 1, Sheet A, is a side elevation of my improvement in brick-machines.

Figure 2, Sheet A, is a top view or plan of the same.

Figure 3, Sheet B, is a longitudinal section, when cut through at line *m*.

In the drawings—

A' represents the frame of the machine.

B' represents the hopper for mixing the clay.

The hopper is provided with a vertical shaft, *n*, from which project a series of mixing-arms, *s*.

On the upper end of this shaft is placed a wheel, *u*, into which gears a wheel, *y*, placed on a shaft, 3, which is supported on pedestal *w*.

The shafts marked 1, 2, 3, and 4 are provided with pulleys for the belts marked *e*, *f*, *g*, and *h*.

The jointed and endless apron A is provided with cogs, or teeth, *x*, which mesh into the teeth, or cogs, of the section of a wheel, R, placed on the shaft 1.

The jointed and endless apron A is also provided with carrying-pieces, or strips, *x*, which are arranged at right angles to the longitudinal plane of the apron A, and at a suitable distance apart, for carrying the moulds *t* directly under the opening *o*, in the bottom of the hopper B'.

The apron A travels over a series of friction-rollers, 5, as shown in fig. 3

Forward of the hopper B', and directly over the apron A, and just sufficiently above the apron to allow the moulds *t* to pass under, is arranged a cut-off, *c*, which is set at an oblique angle to the longitudinal plane of the apron A, as shown in fig. 2.

The endless apron D travels over pulley 8, and rollers 6 and 9, and motion is imparted to the apron through the medium of belt *f*, and pulley on the shaft 2, and is used for carrying off the moulds from the apron A.

The moulds *t* are deposited in the chamber *i* after the moulds have been borne off, and the moulded brick have been delivered from them.

As the skillful mechanic will readily understand the construction and arrangement of the several parts of my improvement in brick-machines, and the relation that said parts bear to each other, from the foregoing description, and by reference to the accompanying drawings, I will therefore proceed to describe their operation, which is as follows:

Motion is imparted to the shaft *l* by applying power to the crank *p*. Then clay, which has been properly moistened with water, is thrown into the hopper B', where it is mixed by the arms *s*.

The revolving of the shaft *l* will cause the belts *e*, *f*, *g*, and *h* to travel in the direction indicated by the arrows shown in figs. 1, 2, and 3.

The moulds and their bottom-boards are placed on the apron A, and carried under the hopper B' by the section of a wheel, R, which will move the apron A at intervals, so that the moulds will have time to fill during each stop in the motion of the apron.

The surplus clay is cut off the top of the moulds as they pass under the cutter *c*.

The moulds pass off the apron A on to the apron D, and are carried along on it to be borne off to be delivered.

The empty moulds are then placed on the belt *h*, and carried back into the mould-chamber *i*. to be again placed on the apron for refilling.

I do not claim the various devices herein shown, for them I know to be severally old; but having thus described the nature, construction, and operation of my improvement,

What I claim as of my invention, is—

The arrangement of the hopper B', endless apron A, wheel R, cut-off C, endless apron D, belt *h*, and mould-chamber *i*, constructed, arranged, and operating as herein described, and for the purpose set forth.

JOHN McMANUS.

Witnesses:
A. C. JOHNSTON,
GEO. H. THOMAS.